(12) United States Patent
Scholz et al.

(10) Patent No.: US 8,893,611 B2
(45) Date of Patent: Nov. 25, 2014

(54) CENTRE ARM FOR HOLDING AN UPPER CONTACT GRILLING OR ROASTING PLATE AS WELL AS CONTACT GRILLING OR ROASTING DEVICES WITH SUCH A CENTRE ARM

(75) Inventors: Kay Scholz, Hamburg (DE); Otto Langguth, Tangstedt (DE); Karsten Anklam, Bargteheide (DE)

(73) Assignee: H.H. Scholz KG, Hamburg (DE)

( * ) Notice: Subject to any disclaimer, the term of this patent is extended or adjusted under 35 U.S.C. 154(b) by 1454 days.

(21) Appl. No.: 12/365,599

(22) Filed: Feb. 4, 2009

(65) Prior Publication Data
US 2010/0107897 A1   May 6, 2010

(30) Foreign Application Priority Data

Nov. 5, 2008   (DE) .......................... 10 2008 056 473

(51) Int. Cl.
A47J 37/06   (2006.01)

(52) U.S. Cl.
CPC .................................. *A47J 37/0611* (2013.01)
USPC ................... 99/377; 99/349; 99/353; 99/400; 99/425

(58) Field of Classification Search
CPC ..................................................... A47J 37/0611
USPC ........... 99/349, 353, 372, 375, 378, 379, 400, 99/425, 446, 426, 340, 369, 377, 391, 99/421 H, 421 HH, 421 V, 424
See application file for complete search history.

(56) References Cited

U.S. PATENT DOCUMENTS

| 2,009,791 | A | * | 7/1935 | Shroyer | .......................... 99/377 |
| 4,989,580 | A | | 2/1991 | Dunham | |
| 5,197,377 | A | * | 3/1993 | Jennings et al. | ................ 99/349 |

(Continued)

FOREIGN PATENT DOCUMENTS

| CH | 610 747 A5 | 5/1979 |
| DE | 839 393 C | 5/1952 |

(Continued)

OTHER PUBLICATIONS

Examination Report, dated Apr. 30, 2009, issued in corresponding German Application No. 10 2008 056 473.7-16.

(Continued)

*Primary Examiner* — Dana Ross
*Assistant Examiner* — Ket D Dang
(74) *Attorney, Agent, or Firm* — Venable LLP; Robert Kinberg; Tamatane J. Aga

(57) ABSTRACT

The invention concerns a center arm for holding an upper contact grilling or roasting plate, the center arm having a substantially vertical supporting section and a holding section which is arranged pivotably on the vertical supporting section and to which the upper contact grilling or roasting plate can be attached, which is distinguished in that a device for fixing the holding section relative to the supporting section is associated with the holding section, the fixing device comprising a control element and a latch device, and the control element being capable of being brought into engagement with the latch device for fixing the holding section in different pivot positions relative to the supporting section, and out of engagement for free pivoting of the holding section relative to the supporting section. Furthermore, the invention concerns a contact grilling or roasting device having such a center arm.

13 Claims, 6 Drawing Sheets

(56) References Cited

U.S. PATENT DOCUMENTS

| | | | |
|---|---|---|---|
| 5,341,727 A * | 8/1994 | Dickson | 99/335 |
| 5,423,253 A | 6/1995 | Olson et al. | |
| 5,619,907 A * | 4/1997 | Orgelmacher | 99/351 |
| 6,467,400 B2 * | 10/2002 | Raio et al. | 99/349 |
| 6,595,116 B1 * | 7/2003 | Lin | 99/349 |
| 6,782,804 B1 * | 8/2004 | Lin | 99/349 |
| 8,100,051 B2 * | 1/2012 | Scholz et al. | 99/351 |
| 2010/0107894 A1 | 5/2010 | Scholz et al. | |
| 2010/0107895 A1 * | 5/2010 | Scholz et al. | 99/372 |
| 2010/0107896 A1 * | 5/2010 | Scholz et al. | 99/372 |

FOREIGN PATENT DOCUMENTS

| | | |
|---|---|---|
| DE | 28 05 997 A1 | 8/1979 |
| EP | 0 662 299 A1 | 7/1995 |
| FR | 2 516 352 A1 | 5/1983 |
| WO | WO-2008/093330 A2 | 8/2008 |

OTHER PUBLICATIONS

Examination Report, dated Mar. 23, 2009, issued in corresponding German Application No. 10 2008 056 474.5-16.

Examination Report, dated Mar. 9, 2009, issued in corresponding German Application No. 10 2008 056 476.1-16.

International Search Report dated Apr. 22, 2010, issued in corresponding PCT Application No. PCT/EP2009/008052.

International Search Report dated Apr. 22, 2010, issued in corresponding PCT Application No. PCT/EP2009/008053.

International Search Report dated Apr. 22, 2010, issued in corresponding PCT Application No. PCT/EP2009/008054.

International Search Report dated Apr. 22, 2010, issued in corresponding for PCT Application No. PCT/EP2009/008055.

\* cited by examiner

CENTRE ARM FOR HOLDING AN UPPER CONTACT GRILLING OR ROASTING PLATE AS WELL AS CONTACT GRILLING OR ROASTING DEVICES WITH SUCH A CENTRE ARM

CROSS-REFERENCE TO RELATED APPLICATIONS

This application claims the priority of German patent application DE 10 2008 056 473.7, filed on Nov. 5, 2008, the subject matter of which is incorporated herein by reference.

BACKGROUND OF THE INVENTION

The invention concerns a centre arm for holding an upper contact grilling or roasting plate, the centre arm having a substantially vertical supporting section and a holding section which is arranged pivotably on the vertical supporting section and to which the upper contact grilling or roasting plate is attached. Furthermore the invention concerns a contact grilling or roasting device having at least one upper contact grilling or roasting plate and a lower contact grilling or roasting plate, the or each upper contact grilling or roasting plate being arranged pivotably by a centre arm on the lower contact grilling or roasting plate.

Centre arms of this kind are used in the field of contact grilling or roasting devices having at least two contact plates designed for contact with the material to be grilled or roasted. Such contact grilling or roasting devices are known e.g. from EP 0 662 299 B1 and include an upper contact grilling or roasting plate and a lower contact grilling or roasting plate, the upper contact grilling or roasting plate being pivotably linked by a centre arm to the lower contact grilling or roasting plate. Associated with both contact plates is a unit which receives the wiring and has corresponding control elements, the unit usually being arranged below the two contact plates. The centre arm is usually in two parts. To put it another way, one centre arm element is mounted rigidly in the region of the lower contact grilling or roasting plate. A second centre arm element is arranged pivotably on the first centre arm element and holds the upper contact grilling or roasting plate. In the region of the centre arm are usually provided two devices for weight relief. A first device for weight relief, namely the weight relief device bearing the main load, is arranged in the vertically oriented centre arm element which is arranged in the region of the lower contact grilling or roasting plate. The second device for weight relief, namely the one for fine adjustment, is arranged in the pivotable centre arm element holding the upper contact grilling or roasting plate.

The contact plates, which are pivotably connected to each other or arranged relative to each other, are movable out of a closed position in which the upper contact grilling or roasting plate is in contact with the lower contact grilling or roasting plate or the material to be grilled or roasted (material to be cooked, for short)—that is, out of a shut position—into an operating position in which the upper contact grilling or roasting plate is pivoted away from the lower contact grilling or roasting plate for inserting or removing the material to be cooked—that is, into an open position, and vice versa. Usually, the upper contact grilling or roasting plate is movable, while the lower contact grilling or roasting plate is stationary. At least the weight relief device which bears the main load and which is arranged in the region of the lower contact grilling or roasting plate in the fixed centre arm element associated with the lower contact grilling or roasting plate serves to facilitate handling, particularly when opening the upper contact grilling or roasting plate. But furthermore the above-mentioned weight relief device also serves to hold or fix the upper contact grilling or roasting plate in a largely vertical position—that is, the fully open position—in order to prevent the upper contact grilling or roasting plate from "dropping shut" undesirably.

However, fixing the upper contact grilling or roasting plate exclusively in the fully open position, which exists due to the weight relief device, has the drawback that even minor vibrations or other external influences can lead to the upper contact grilling or roasting plate dropping shut undesirably. As a result, on the one hand the material to be cooked can be damaged and so become unusable. On the other hand, as a result there is a risk of injury to the operator. A further drawback lies in that the upper contact grilling or roasting plate is held or fixed stably only in the end positions, closed position and operating position, so that there are only limited possibilities of use.

SUMMARY OF THE INVENTION

It is therefore the object of the invention to provide a safe and universally usable centre arm having an easy-to-handle device for variably fixing the upper contact grilling or roasting plate. It is also the object of the invention to propose a corresponding contact grilling or roasting device.

The object is achieved by a centre arm having the features mentioned hereinbefore by the fact that a device for fixing the holding section relative to the supporting section is associated with the holding section, the fixing device comprising a control element and a latch device, and the control element being capable of being brought into engagement with the latch device for fixing the holding section in different pivot positions relative to the supporting section, and out of engagement for free pivoting of the holding section relative to the supporting section. Due to the design according to the invention, for the first time in a surprisingly simple manner it is made possible to fix the upper contact grilling or roasting plate in all desired angular positions between the two end positions. By this means e.g. use under different extractor hoods is also ensured, particularly with rear wall slope extraction. Due to mechanical fixing, the upper contact grilling or roasting plate is always secured and can be moved up or down only by manual actuation of the control element.

An appropriate development of the invention provides that the pivot shaft of the holding section is formed or arranged approximately at the point of intersection of the centre axes of the holding section on the one hand and the supporting section on the other hand. With this design according to the invention, an arrangement and design of the fixing device which is structurally particularly simple, namely saves parts and is therefore cheaper, is ensured. Due to the central arrangement of the pivot shaft, the fixing device can be associated directly with the pivot shaft, so that deflecting elements or the like can be avoided.

Advantageously, the latch device has two grooved discs which are arranged on the pivot shaft of the holding section. This design allows, in a particularly easy and reliable manner, fixing of the upper contact grilling or roasting plate in desired positions. Furthermore, the fixing device according to the invention for the first time also allows the arrangement of upper contact grilling or roasting plates of larger dimensions and therefore higher weights on a centre arm.

The object is also achieved by a contact grilling or roasting device of the kind mentioned hereinbefore by the fact that the centre arm is designed according to any one of claims 1 to 11. The resulting advantages have already been mentioned in connection with the centre arm, so that reference is made to the corresponding passages to avoid repetition.

BRIEF DESCRIPTION OF THE DRAWINGS

Further appropriate and/or advantageous features and developments are apparent from the subsidiary claims and the description. A particularly preferred embodiment is described in more detail with the aid of the attached drawings. The drawings show:

BRIEF DESCRIPTION OF THE EMBODIMENTS

The centre arm shown in the figures serves as a conversion kit or, in combination with an upper contact grilling or roasting plate, as an independent grilling or roasting device, and can be used on its own or in combination with a lower contact grilling or roasting plate to form a contact grilling or roasting device.

Figure 1:
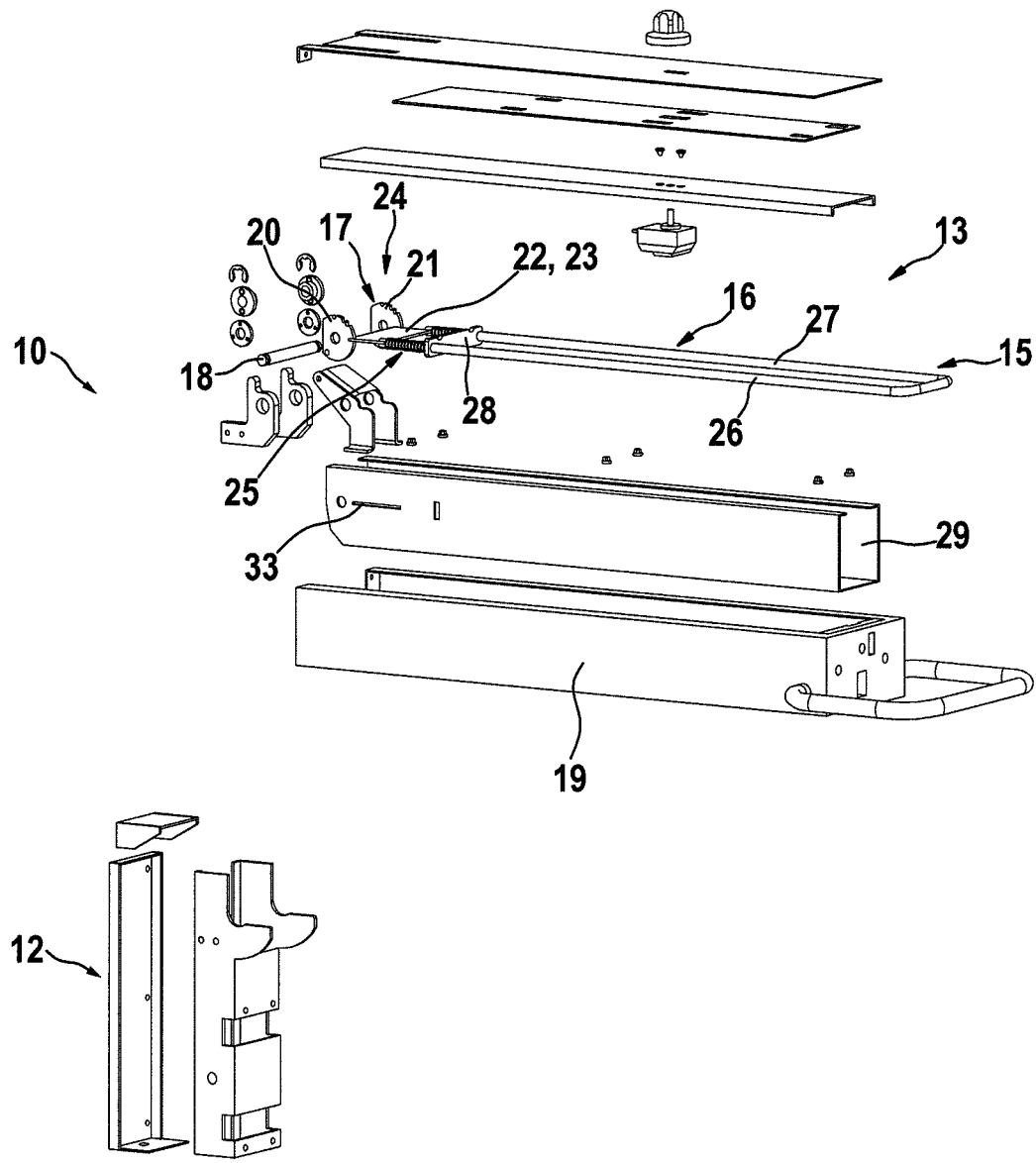
FIG. 1 an exploded view of a centre arm according to the invention.

FIG. 1 shows an exploded view of a centre arm 10 which is constructed and designed to receive an upper contact grilling or roasting plate 11. The centre arm 10 essentially consists of a vertical supporting section 12 and a holding section 13 arranged pivotably on the supporting section 12. The term "vertical supporting section 12" means that the supporting section 12 is oriented perpendicularly to a plane E usually spanned by a table, a base or the like or by a lower contact grilling or roasting plate 14, expressly also including an orientation which is slightly inclined from the perpendicular. The upper contact grilling or roasting plate 11 can be attached to the holding section 13.

Associated with the holding section 13 is a device 15 for fixing the holding section 13 relative to the supporting section 12. The fixing device 15 comprises a control element 16 and a latch device 17. The control element 16 can be brought into engagement with the latch device 17 for fixing the holding section 13 in different pivot positions relative to the supporting section 12, and out of engagement for free pivoting of the holding section 13 relative to the supporting section 12. To put it another way, a mechanical working connection for fixing can be made, manual actuation being necessary to release this working connection for pivoting. The pivot shaft 18 of the holding section 13 is formed or arranged approximately at the point of intersection of the centre axes $M_1$ of the holding section 13 on the one hand and $M_2$ of the supporting section 12 on the other hand. To put it another way, the pivot shaft 18 is arranged centrally in relation to the linkage point between supporting section 12 and holding section 13.

The whole latch device 17 is arranged completely within the holding section 13, and to be more precise in a housing 19 of the holding section 17. The latch device 17 preferably has two grooved discs 20, 21. These grooved discs 20, 21 are spaced apart from each other on the pivot shaft 18 of the holding section and locked by suitable means, for example spring rings or the like. Several functions are therefore combined on the pivot shaft 18. Furthermore, the latch device 17 comprises latch means 22 which correspond to the grooved discs 20, 21. The latch means 22 can be in one or several parts. Preferably the latch means 22 is a single-part, plate-like element 23 which on the one hand is so thin that it can engage in the grooves of the grooved discs 20, 21, and on the other hand is so wide that at the same time it can be brought into functional connection with the two grooved discs 20, 21.

Figure 4:
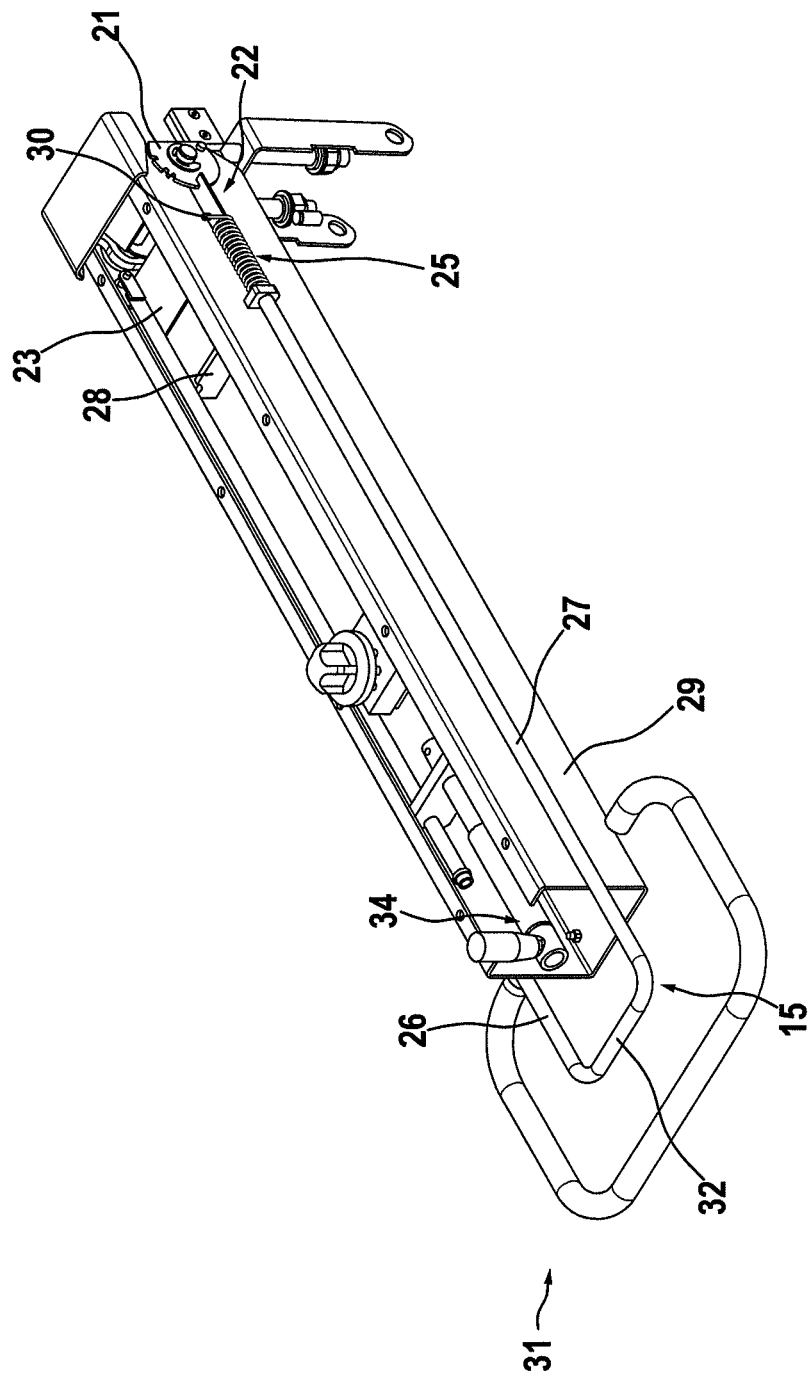

The latch means 22 is associated with the control element 16. To be more precise, the latch means 22 is arranged at the end 24 of the control element 16 which faces towards the pivot shaft 18 of the holding section 13, and preferably releaseably connected thereto. In the embodiment shown, the control element 16 ends at a distance from the grooved discs 20, 21. The distance is compensated or bridged by the latch means 22 in the latched state. This distance is variable and can be compensated by the length of the exchangeable control element 16. In order to disengage the control element 16 or latch means 22 from the grooved discs 20, 21 out of the latched position (see e.g. FIG. 4), the control element 16 is movable against a return element 25 which is associated with the control element 16, by a pulling movement away from the pivot shaft 18.

The control element 16 comprises two latch rods 26, 27 at the free end 24 of which is arranged the latch means 22. The latch rods 26, 27 are, starting from the grooved discs 20, 21 or from the latch means 22, guided linearly forwards in the direction of the end face of the centre arm 10. The latch rods 26, 27 are mounted or supported at least by means of a supporting web 28 which serves as an abutment for the control element 16 and is arranged at a distance from the grooved discs 20, 21. The supporting web 28 can be attached e.g. to the housing 19. In the preferred embodiment the supporting web 28 is attached to an inner housing 29 which is arranged within the housing 19 and divides the interior of the housing 19 into several chambers. The latch rods 26, 27 are guided through openings in the supporting web 28. The supporting web 28 is preferably also guided through the inner housing 29. For this purpose the inner housing 29 is provided with a slot 33 into which the supporting web 28 is introduced. The slot 33 is constructed and designed for definite movement of the supporting web 28.

Between the supporting web 28 and the free end 24 of the latch rods 26, 27, on each latch rod 26, 27 is arranged a compression spring as a return element 25, the compression springs being secured on the latch rods 26, 27 e.g. by a locking pin 30 or the like. Locking of the compression springs which are exchangeable to vary the spring weight can also take place at the free end 24 by the latch means 22.

Figure 5:
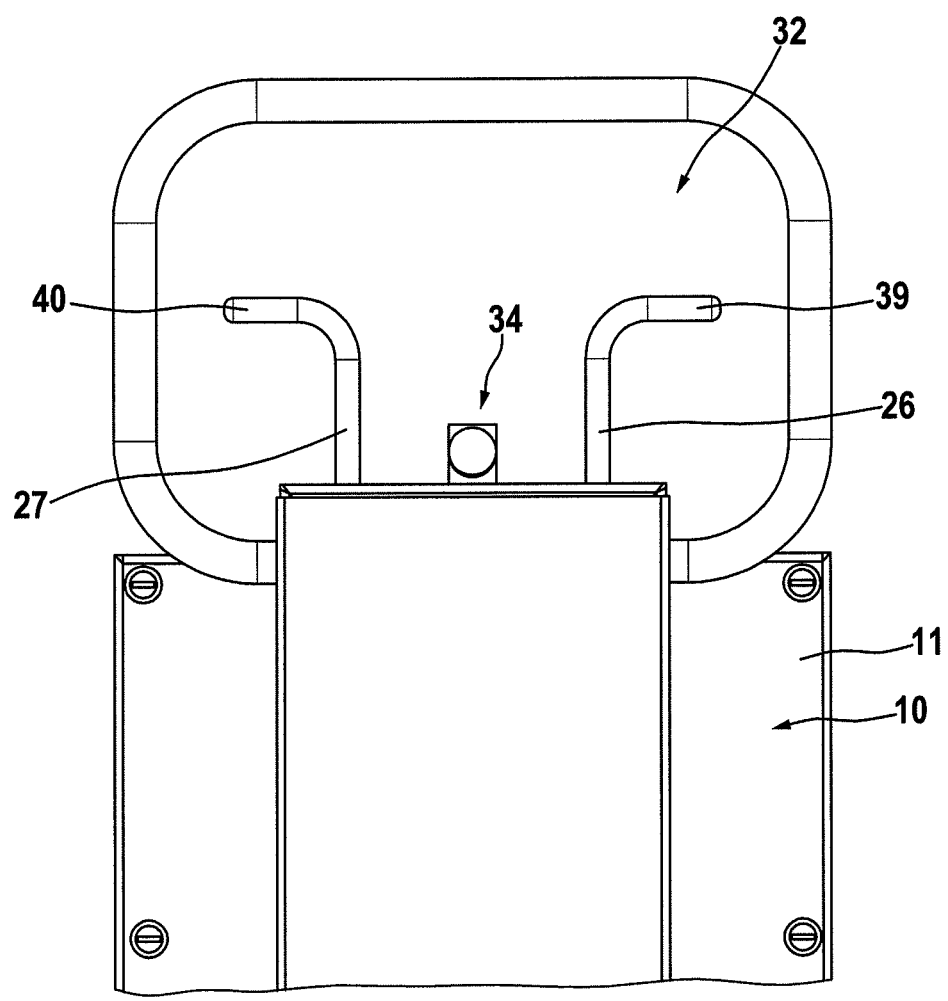

The control element 16 or the latch rods 26, 27 have an actuating element 32 at the end 31 opposite the latch means 22. The actuating element 32 is preferably a handle which at the end face protrudes out of the housing 19 of the centre arm 10. The handle forms as it were an extension of the latch rods 26, 27 which connect the handle to the latch means 22. Preferably the latch rods 26, 27 and the actuating element 32, that is, the handle, are constructed in one piece such that the actuating element 32 is an integral part of the latch rods 26, 27. In an alternative embodiment (see FIG. 5) the actuating element 32 is divided. This means that the latch rods 26, 27 each have a free end 39, 40 which protrudes from the housing 19 and is preferably bent. In the embodiment shown, the free ends 39, 40 point in opposite directions, so that both hands are needed to operate the device 15. This is a safety aspect during operation of the device 15, which can be solved structurally in other ordinary ways as well.

As already mentioned above, an upper contact grilling or roasting plate 11 is associated with the centre arm 10 (see e.g.

Figure 2:
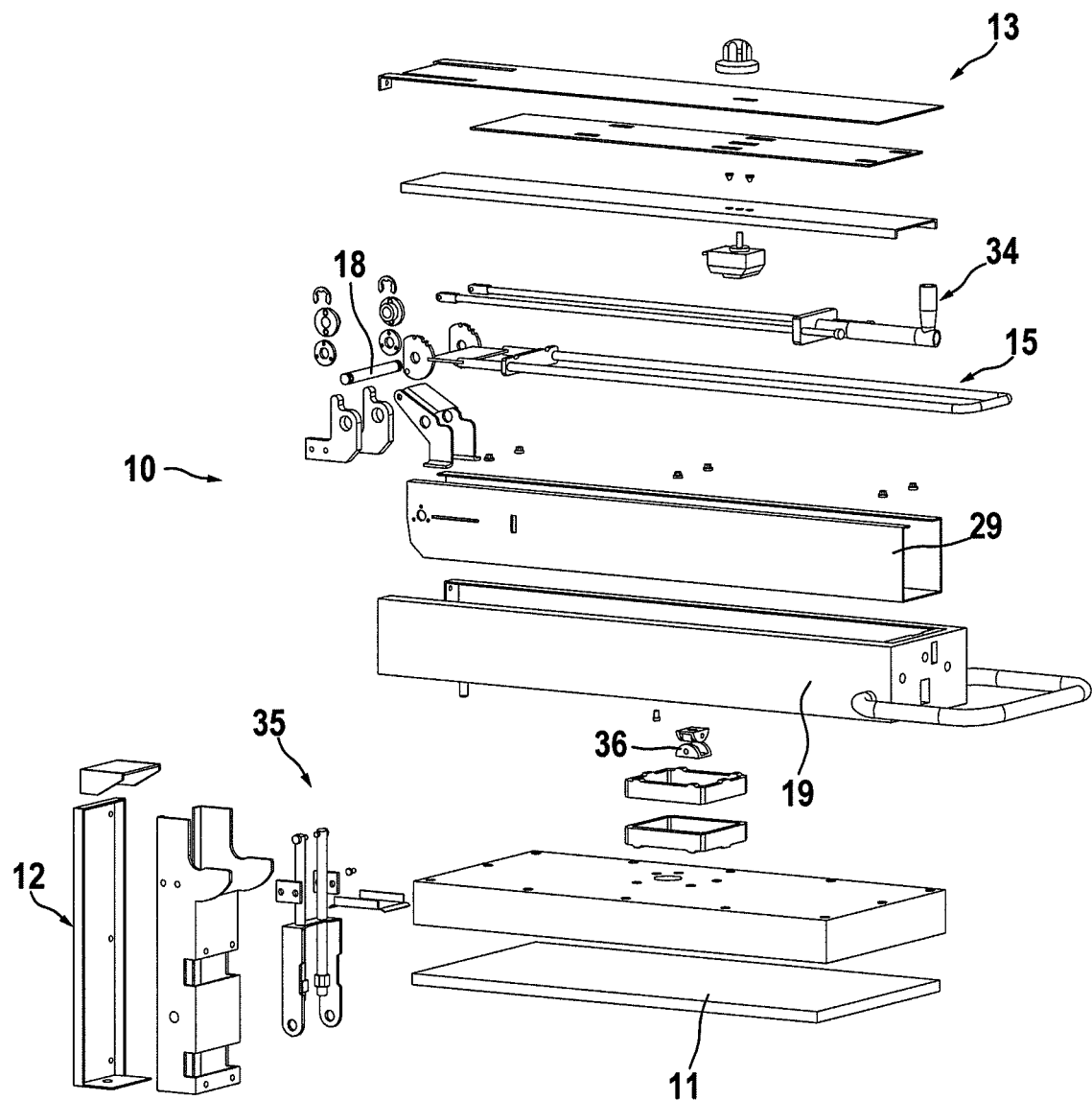
FIG. 2 an exploded view of a centre arm holding an upper contact grilling or roasting plate, FIG. 3 a side view of a centre arm with upper contact grilling or roasting plate, FIG. 4 a perspective view of parts of the holding section of the centre arm with the fixing device, FIG. 5 a top view of a detail of the centre arm, and FIG. 6 a contact grilling or roasting device with upper and lower contact grilling or roasting plates.
Figure 3:
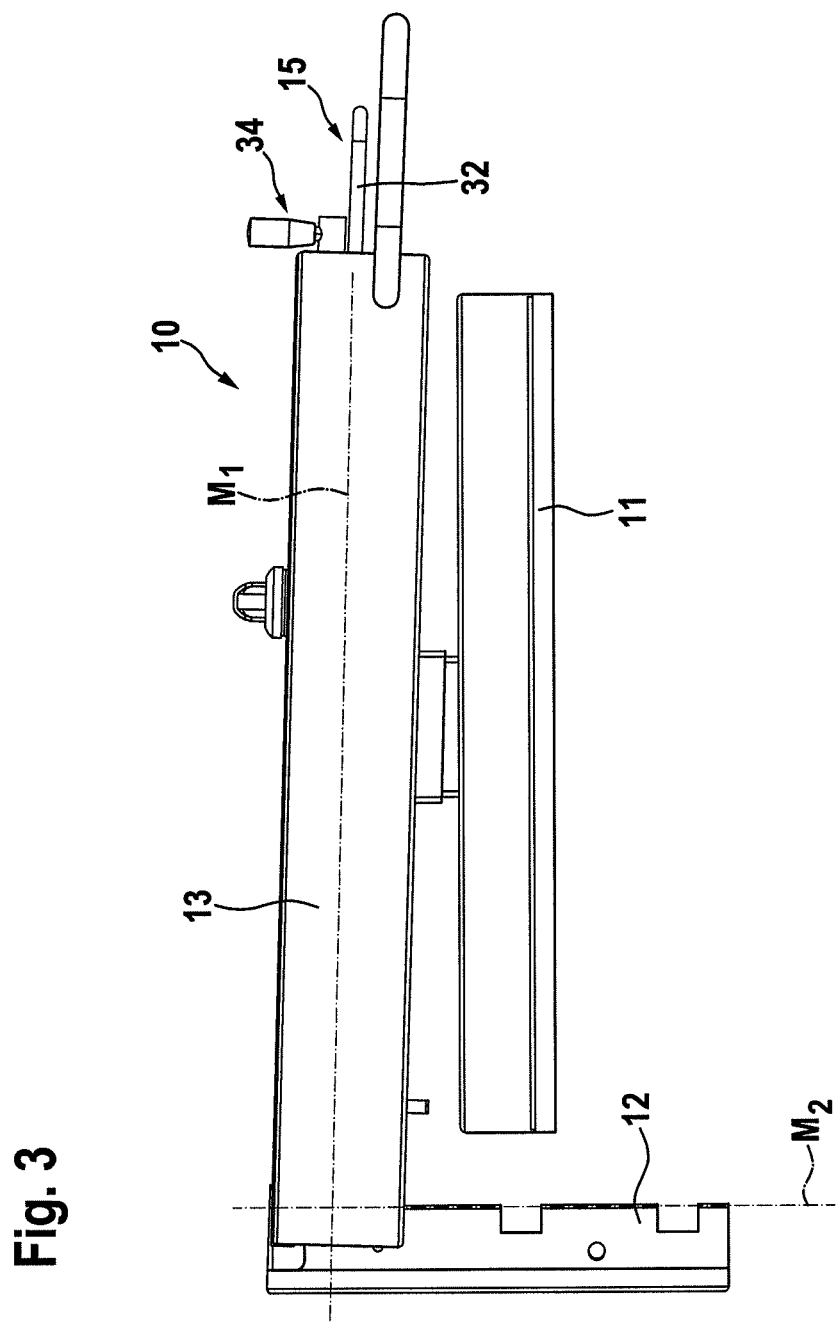

FIGS. 2 and 3). The upper contact grilling or roasting plate 11 can be attached to the centre arm 10 so as to be fixed or movable, preferably by a universal joint 36 or the like. The centre arm 10 can further have other components, optionally. Firstly, a first device 34 for weight relief for the upper contact grilling or roasting plate 11 arranged on the holding section 13 can be associated with the centre arm 10. This first device 34 is arranged in the holding section 13 of the centre arm 10. Secondly, a second device 35 for weight relief which is arranged in the supporting section 12 of the centre arm 10 can be associated with the centre arm 10. The arrangement or placement of the pivot shaft 18 is also variable and can, in departure from the position on the holding section 13 described above, also be on the supporting section 12.

Figure 6:
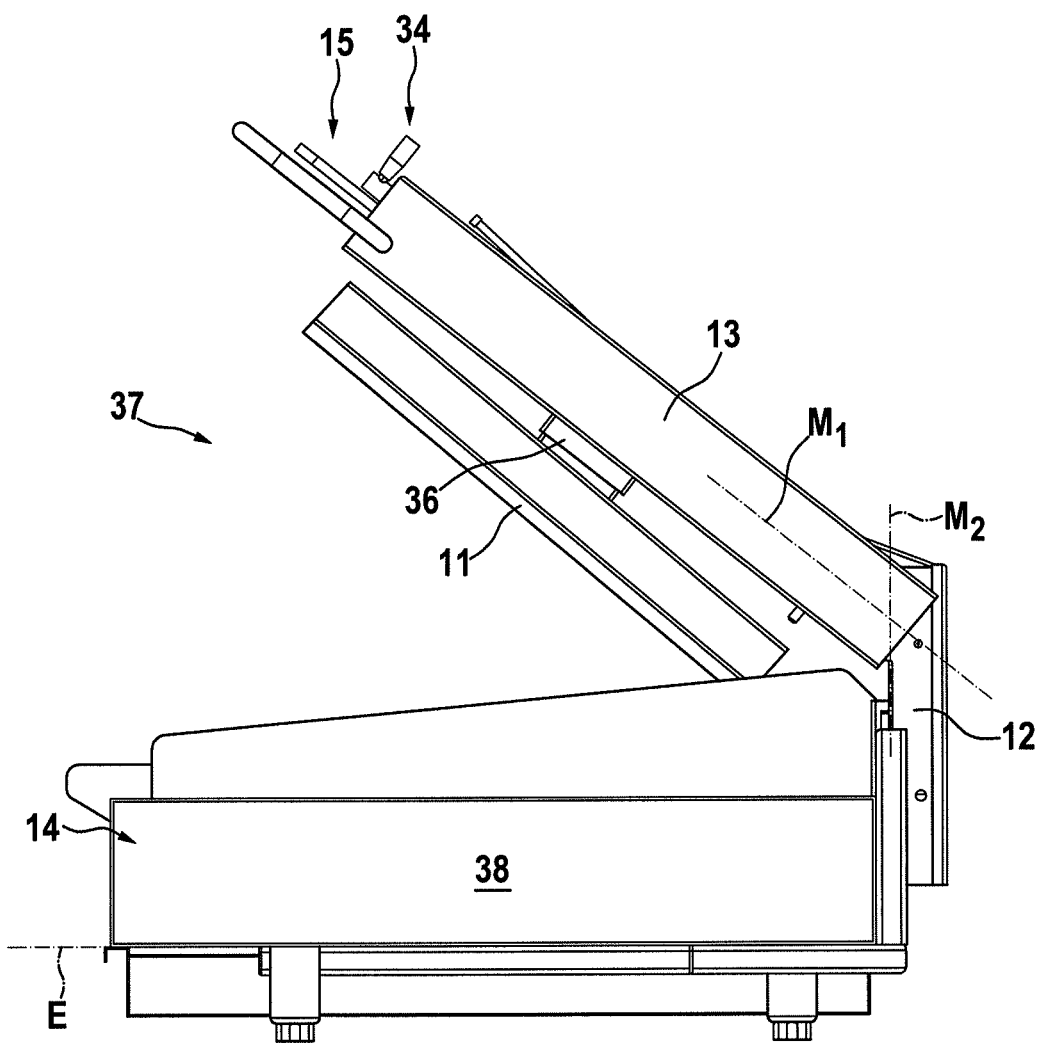

The centre arm 10 described above forms, together with the upper contact grilling or roasting plate 11 and the lower contact grilling or roasting plate 14, an electric contact grilling or roasting device 37 (see e.g. FIG. 6). Associated with the contact grilling or roasting device 37 is an electrical unit 38 which preferably forms part of the lower contact grilling or roasting plate 14. But the centre arm 10 can, together with the upper contact grilling or roasting plate 11, also be associated with a gas-operated or otherwise operated lower grilling or roasting plate. Further, two or more upper contact grilling or roasting plates 11 can be associated with a common lower contact grilling or roasting plate 14 or other lower grilling or roasting plates.

The invention claimed is:

1. A centre arm for holding an upper contact grilling or roasting plate, comprising:
   a substantially vertical supporting section and a holding section,
   wherein the holding section is pivotably arranged on the substantially vertical supporting section,
   wherein the holding section is adapted to attach to the upper contact grilling or roasting plate;
   a fixing device configured to fix the holding section relative to the substantially vertical supporting section,
   wherein the fixing device comprises a control element and a latch device,
   wherein the control element is engageable with the latch device to fix the holding section in different pivot positions about a pivot axis relative to the substantially vertical supporting section,
   wherein the control element is disengageable with the latch device for free pivoting of the holding section relative to the substantially vertical supporting section, and
   wherein the pivot axis is approximately at a point of intersection of a centre axis of the holding section and a centre axis of the substantially vertical supporting section.

2. The centre arm of claim 1, further comprising a pivot shaft comprising the pivot axis positioned approximately at the point of intersection of the centre axis of the holding section and the centre axis of the substantially vertical supporting section.

3. The centre arm of claim 2, wherein the latch device includes two grooved discs arranged on the pivot shaft of the holding section.

4. The centre arm of claim 3, wherein the latch device includes a latch element which corresponds to grooves in the grooved discs.

5. The centre arm of claim 4, wherein the latch element is arranged at an end of the control element which faces towards the pivot shaft of the holding section.

6. The centre arm of claim 5, wherein the control element comprises two latch rods and a return element operatively associated with the two latch rods to bias the latch element in a direction toward the grooved discs.

7. The centre arm of claim 5, wherein the control element includes an actuating element at an end opposite the latch device.

8. The centre arm of claim 7, wherein the holding section comprises a housing and the actuating element protrudes out of the housing at an end face remote from the latch device.

9. The centre arm of claim 7, wherein the latch rods connect the actuating element to the latch element.

10. The centre arm of claim 9, wherein the latch rods and the actuating element comprise one integral piece.

11. The centre arm of claim 1, wherein the latch device is arranged completely within the holding section.

12. A combination comprising the centre arm of claim 1 and the upper contact grilling or roasting plate attached to the centre arm.

13. A contact grilling or roasting device comprising the centre arm according to claim 1, and further comprising:
   a lower grilling or roasting plate,
   wherein the centre arm pivotably connects the upper contact grilling or roasting plate on the lower grilling or roasting plate.

* * * * *